United States Patent
Kawakami et al.

[11] Patent Number: 5,908,917
[45] Date of Patent: Jun. 1, 1999

[54] POLYGLYCOLIC ACID SHEET AND PRODUCTION PROCESS THEREOF

[75] Inventors: Yukichika Kawakami; Nobuo Sato; Mitsuru Hoshino; Toshitaka Kouyama, all of Fukushima; Zenya Shiiki, Chiba, all of Japan

[73] Assignee: Kureha Kagaku Kogyo K.K., Tokyo, Japan

[21] Appl. No.: 08/844,409

[22] Filed: Apr. 18, 1997

[30] Foreign Application Priority Data

Apr. 30, 1996 [JP] Japan .................................. 8-134218
Apr. 8, 1997 [JP] Japan .................................. 9-105161

[51] Int. Cl.$^6$ .................................................. C08G 63/08
[52] U.S. Cl. ........................ 528/354; 528/425; 528/503; 525/419; 525/420; 521/79; 264/46.1; 264/46.2; 264/75; 264/77; 264/160; 264/239
[58] Field of Search ..................... 528/354, 425, 528/503; 264/46.1, 46.2, 75, 77, 160, 239; 521/79; 525/419, 420

[56] References Cited

U.S. PATENT DOCUMENTS 2,668,162  2/1954  Lowe .
2,676,945  4/1954  Higgins .
5,502,158  3/1996  Sinclair et al. .

FOREIGN PATENT DOCUMENTS 0677561  10/1995  European Pat. Off. .
6-256480  9/1994  Japan .
6-256481  9/1994  Japan .

OTHER PUBLICATIONS

D.K. Gilding et al (1979) *Polymer*, vol. 20, pp. 1459–1463.
European Search Report for Application No. 97302906.9 dated Sep. 4, 1997.

*Primary Examiner*—Duc Truong
*Attorney, Agent, or Firm*—Dinsmore & Shohl LLP

[57] ABSTRACT

The invention provides a polyglycolic acid sheet obtainable by melt-extruding a thermoplastic resin material into a sheet in a temperature range of from the melting point, Tm of the polymer to 255° C., wherein the thermoplastic resin material comprises polyglycolic acid having a repeating unit represented by the following formula (1):

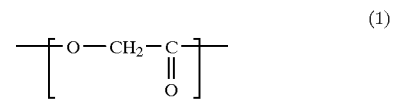

and the following physical properties:

(a) the melt viscosity, $\eta^*$ [as measured at a temperature of (the melting point, Tm of the polymer+20° C.) and a shear rate of 100/sec] being 500–100,000 Pa.s;
(b) the melting point, Tm being at least 150° C.;
(c) the melt enthalpy, $\Delta Hm$ being at least 20 J/g; and
(d) the density being at least 1.50 g/cm$^3$ as measured in an unoriented, crystallized form, and the sheet has tensile strength of at least 60 MPa, and a production process thereof.

19 Claims, No Drawings

POLYGLYCOLIC ACID SHEET AND PRODUCTION PROCESS THEREOF

FIELD OF THE INVENTION

The present invention relates to a sheet formed from a thermoplastic resin material comprising polyglycolic acid, and more particularly to a polyglycolic acid sheet which has excellent toughness, degradability in soil and barrier properties, and to a production process thereof. By secondarily processing the polyglycolic acid sheet according to the present invention, it can be used in a wide variety of fields as, for example, containers for electronic ranges, retort food packaging materials, medical instrument packaging materials capable of subjecting to high-temperature sterilization, containers for boiling water pouring type instant food, egg cartons and cushioning materials.

BACKGROUND OF THE INVENTION

In recent years, increase in plastic waste has become a great social problem. Since many of polymeric materials have hitherto been developed and produced in search of high performance and long-term stability, they are not easily decomposed in a natural environment. Therefore, how to dispose and manage a large quantity of plastic waste which has become useless becomes a social problem on a worldwide scale. The plastic waste includes sheets formed from a variety of synthetic resins, such as polyolefin resins such as polyethylene and polypropylene, polyester resins such as polyethylene terephthalate, polyamide resins such as nylon, and chlorine-containing resins such as polyvinylidene chloride, and trays and containers obtained by secondarily processing these sheets.

Under the circumstances, biodegradable polymers, which are degraded by natural microorganisms, attract attention as polymeric materials which impose no burden on the environment. The biodegradability can be evaluated by, for example, a degradability test in soil (soil degradability test). Since plastic sheets are required to have good mechanical properties, thermal properties, barrier properties, melt processability, profitability and the like, however, any plastic sheet, which fully satisfies these requirements and exhibits biodegradability, has not been yet obtained.

Among the conventional biodegradable plastic sheets, for example, sheets based on starch are unsatisfactory in toughness, barrier properties and heat resistance and involve a problem that they are difficult to melt-process, so that its processing cost becomes high. Sheets based on cellulose are unsatisfactory in toughness and involve a problem that they are difficult to melt-process, so that its processing cost becomes high. Sheets based on a microorganism-produced polyester are unsatisfactory in toughness and involve a great problem that their production cost becomes particularly high. Sheets based on a synthetic type polyester such as a polysuccinate are unsatisfactory in toughness and barrier properties and involve a problem that succinic acid and butanediol, which are raw materials for the polyester, are considerably expensive.

Sheets based on polylactic acid, which is a semi-synthetic type polyester, are unsatisfactory in toughness. Since L-lactic acid, which is an optically active substance used as a raw material, is required to have a high purity, the sheets must be produced through fermentation of a biological process, and there is hence a limit to their production at low cost. Further, since polylactic acid has a high glass transition temperature, Tg, it also involves a problem that it is difficult to compost under ordinary composting conditions.

With respect to films based on polyglycolic acid, which are synthetic polyester films, Higgins et al. (U.S. Pat. No. 2,676,945, issued in 1954) disclose amorphous films having a thickness of 3 mils and biaxially stretched films obtained by stretching them. These films are those obtained by using a polymer obtainable by directly polycondensing glycolic acid, not a polymer obtainable by ring-opening polymerization of glycolide. However, the polycondensation process of glycolic acid includes heating and polycondensing glycolic acid for a long period of time as about 40 hours at a high temperature of at least 200° C. and hence tends to involve side reactions such as decomposition reaction. Accordingly, this process is difficult to provide a practicable polymer having a high molecular weight. U.S. Pat. No. 2,676,945 describes, in its example, the melt viscosity of the polymer as about 2,000 poises (at 245° C.). This melt viscosity value corresponds to a value measured at a shear rate of about 0/sec. This melt viscosity value corresponds to a value extremely as low as about 20 poises (at 245° C.) when converted into a value measured at a shear rate of 100/sec. In addition, there is a high possibility that this polymer may have an unstable structure due to side reactions. Accordingly, an extrusion film formed from the polymer obtained by such a direct polycondensation process has extremely low mechanical strength as demonstrated by its tensile strength extremely as low as 5,470 psi (about 39 MPa) and hence has involved a problem that it is unsatisfactory from the view point of practical use.

Gilding et al. [POLYMER, 20, 1459 (1979)] provide films having a thickness of 250 $\mu$m from 20% solutions of glycolic acid copolymers (glycolide/lactide=90/10, 70/30, 50/50, etc.) by a casting process. However, this process tends to form coarse spherulites upon evaporation of a solvent, and the resultant films are hence extremely brittle and unsatisfactory in mechanical strength from the viewpoint of practical use.

Japanese Patent Application Laid-Open Nos. 256480/1994 and 256481/1994 disclose that polyglycolic acid having a viscosity-average molecular weight of 280,000 or 250,000 was used as a raw material, this polymer was melt-extruded and cast at 280° C. into an unoriented sheet, and the unoriented sheet was then stretched 3 times in a machine direction and 4 or 3 times in a transverse direction at 160° C. to obtain a biaxially oriented film (in each document, Example 3). However, polyglycolic acid tends to undergo thermal decomposition at a temperature exceeding about 255° C. and actually substantially undergoes thermal decomposition at the temperature as high as 280° C., so that any satisfactory unoriented sheet cannot be obtained. It is a matter of course that if such an unoriented sheet is biaxially stretched, it is scarcely possible to obtain a biaxially oriented film having sufficient strength. An amorphous sheet of polyglycolic acid is crystallized at a temperature exceeding its crystallization temperature $Tc_1$ (about 80° C.) and highly crystallized at a temperature as high as 160° C., so that the biaxial stretching of the amorphous sheet, for example, 3 times in a machine direction and 3 or 4 times in a transverse direction, is extremely difficult or actually impossible under such stretching conditions. Accordingly, any sheet or oriented film having sufficient strength cannot be obtained under the conditions disclosed in these publications. Besides, the meaning of the viscosity-average molecular weight of 250,000 or 280,000 and its measuring method are also unclear. Accordingly, it can be hardly said that these publications actually disclose high-molecular weight polyglycolic acid in the light of the state of the art.

OBJECTS AND SUMMARY OF THE INVENTION

It is an object of the present invention to cheaply provide a polyglycolic acid sheet, which has excellent toughness and barrier properties and exhibits high degradability in soil.

The present inventors have carried out an extensive investigation with a view toward overcoming the above problems involved in the prior art. As a result, it has been found that a sheet formed from a thermoplastic resin material comprising polyglycolic acid having specific physical properties has high tensile strength, satisfactory elongation, exhibits good degradability in soil and excellent barrier properties, and can be produced at a relatively low price.

In order to obtain the polyglycolic acid sheet of the present invention having excellent strength, it is necessary to use polyglycolic acid having a sufficiently high molecular weight. Such a polyglycolic acid can be obtained, for example, by heating glycolide (i.e., a dimeric cyclic ester of glycolic acid) in the presence of a catalyst (for example, a cationic catalyst such as a tin organic carboxylate, tin halide or antimony halide), thereby subjecting it to bulk ring-opening polymerization or solution ring-opening polymerization. In order to obtain polyglycolic acid having excellent physical properties, it is essential to use high-purity glycolide as a monomer. The high-purity glycolide can be obtained with good productivity by a process in which an oligomer of glycolic acid is mixed with a high-boiling polar organic solvent, the mixture is heated under ordinary pressure or reduced pressure to a temperature at which depolymerization of the oligomer occurs, thereby depolymerizing the oligomer in a state that the oligomer forms a solution phase, glycolide formed is distilled out together with the high-boiling polar organic solvent, and the glycolide is recovered from the distillate.

An example of a process for forming a sheet from the polyglycolic acid includes a process in which the polyglycolic acid alone or a composition containing the polyglycolic acid is melt-extruded through a T-die into a sheet.

The polyglycolic acid can be industrially mass-produced by using extremely cheep raw materials of CO, $H_2O$ and $CH_2O$ or ethylene glycol. Since the polyglycolic acid sheet has degradability in soil, it scarcely imposes burden on the environment.

The present invention has been led to completion on the basis of these findings.

According to the present invention, there is thus provided a polyglycolic acid sheet obtainable by melt-extruding a thermoplastic resin material into a sheet in a temperature range of from the melting point, Tm of the polymer to 255° C., wherein the thermoplastic resin material comprises polyglycolic acid having a repeating unit represented by the following formula (1):

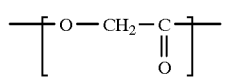

(1)

and the following physical properties:

(a) the melt viscosity, $\eta^*$ [as measured at a temperature of (the melting point, Tm of the polymer+20° C.) and a shear rate of 100/sec] being 500–100,000 Pa.s;

(b) the melting point, Tm being at least 150° C.;

(c) the melt enthalpy, $\Delta Hm$ being at least 20 J/g; and (d) the density being at least 1.50 g/cm³ as measured In an unoriented, crystallized form, and the sheet has tensile strength of at least 60 MPa.

According to the present invention, there is also provided a process for producing a polyglycolic acid sheet, comprising the steps of melt-extruding a thermoplastic resin material which comprises polyglycolic acid having a repeating unit represented by the following formula (1):

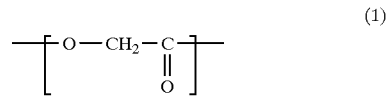

(1)

and the following physical properties:

(a) the melt viscosity, $\eta^*$ [as measured at a temperature of (the melting point, Tm of the polymer+20° C.) and a shear rate of 100/sec] being 500–100,000 Pa.s;

(b) the melting point, Tm being at least 150° C.;

(c) the melt enthalpy, $\Delta Hm$ being at least 20 J/g; and (d) the density being at least 1.50 g/cm³ as measured in an unoriented, crystallized form, through a T-die into a sheet in a temperature range of from Tm to 255° C.; quenching the sheet to the crystallization temperature, $Tc_1$ of the polymer or lower; and optionally heat-setting the quenched sheet for 1 second to 3 hours in a temperature range of from the crystallization temperature, $Tc_1$ to (Tm+10° C.) under tension or under no tension.

DETAILED DESCRIPTION OF PREFERRED EMBODIMENTS

The present invention will hereinafter be described in detail.

Structure of polymer

The polyglycolic acid useful in the practice of the present invention is a polymer having a repeating unit represented by the following formula (1):

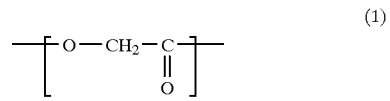

(1)

The proportion of the repeating unit represented by the formula (1) in the polymer is generally at least 70 wt. %, preferably at least 80 wt. %, more preferably 90 wt. %. If the proportion of the repeating unit represented by the formula (1) is lower than 70 wt. %, there is a possibility that the toughness and barrier properties of the resulting polymer may be deteriorated, and its degradability in soil may be impaired.

As examples of other repeating units than the repeating unit represented by the formula (1), may be mentioned a repeating unit represented by the following formula (2):

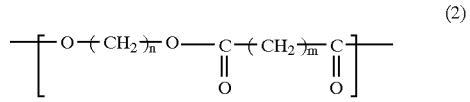

(2)

wherein n is 1–10, and m is 0–10, a repeating unit represented by the following formula (3):

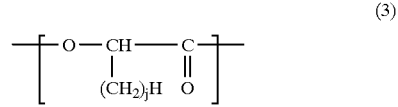

(3)

wherein j is 1–10, a repeating unit represented by the following formula (4):

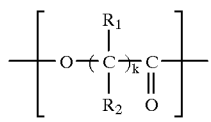

wherein $R_1$ and $R_2$ are independently a hydrogen atom or an alkyl group having 1–10 carbon atoms, and k is 2–10, and a repeating unit represented by the following formula (5):

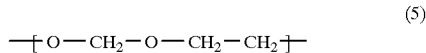

When these repeating units are introduced in a proportion of at least 1 wt. %, the melting point, Tm of the glycolic acid homopolymer can be lowered to lower the processing temperature of the polymer, whereby thermal decomposition upon melt processing can be reduced. Besides, the crystallization rate of the polyglycolic acid can be controlled by the copolymerization to improve its extrudability and stretchability. However, if the proportion of these repeating units (2) to (5) exceeds 30 wt. %, the crystallizability inherent in the polyglycolic acid is impaired, so that there is a possibility that the toughness and heat resistance of the resulting sheet may be deteriorated to a marked extent.

Physical properties of polymer

<Molecular weight—melt viscosity>

The polyglycolic acid used as a raw material for the sheet according to the present invention is a high-molecular weight polymer. The melt viscosity of the polymer can be used as an index to its molecular weight. The polyglycolic acid used in the present invention has a melt viscosity, $\eta^*$ of 500–100,000 Pa.s, preferably 1,000–50,000 Pa.s, more preferably 1,500–20,000 Pa.s as measured at a temperature of (Tm+20° C.) (i.e., a temperature corresponding to a usual melt-processing temperature) and a shear rate of 100/sec.

If the melt viscosity, $\eta^*$ of the polyglycolic acid is lower than 500 Pa.s, there is a possibility that a melt of the polymer may undergo drawdown upon its melt-forming into a sheet, a sheet melt-extruded through a T-die may undergo deformation during its quenching, resulting in difficulty in melt processing, or the toughness of the resulting sheet may become insufficient. If the melt viscosity, $\eta^*$ of the polyglycolic acid is higher than 100,000 Pa.s, its melt processing requires a higher temperature, and there is a possibility that the polyglycolic acid may undergo heat deterioration upon the processing.

<Thermal properties>

The melting point, Tm of the polyglycolic acid useful in the practice of the present invention is at least 150° C., preferably at least 190° C., more preferably at least 210° C. The melt enthalpy, $\Delta Hm$ of the polyglycolic acid used in the present invention is at least 20 J/g, preferably at least 30 J/g, more preferably 40 J/g.

Polyglycolic acid having a Tm lower than 150° C. and/or a $\Delta Hm$ smaller than 20 J/g is considered to be such that its degree of crystallinity is lowered due to the disorder of its intramolecular chemical structure, and consequently the Tm and/or $\Delta Hm$ may be lowered. Accordingly, a sheet formed from such a polyglycolic acid has a possibility that the toughness may be lower, and the heat resistance may also be insufficient.

<Density>

The polyglycolic acid used in the present invention has a density of at least 1.50 g/cm³, preferably 1.51 g/cm³, more preferably 1.52 g/cm³ as measured in an unoriented, crystallized form. Low-density polyglycolic acid having a density lower than 1.50 g/cm³ is considered to be such that its degree of crystallinity is lowered due to the disorder of its intramolecular chemical structure, and consequently the density may be lowered. Accordingly, a sheet formed from such a polyglycolic acid has a possibility that the degree of crystallinity may be low, and the toughness and heat resistance may be insufficient.

General properties of sheet

<Tensile strength-elongation>

Since the sheet according to the present invention is formed by using the above-described specific polyglycolic acid, it has tensile strength of at least 60 MPa, preferably at least 80 MPa, more preferably at least 100 MPa, and often at least 130 MPa. Such a sheet is a sheet having sufficient strength from the viewpoint of practical use.

Since the sheet according to the present invention is formed by using the above-described specific polyglycolic acid, it has tensile elongation of generally at least 5%, preferably at least 7%, more preferably at least 9%. Such a sheet is a sheet having sufficient elongation from the viewpoint of practical use.

With the cooperation of high tensile strength and high elongation, the polyglycolic acid sheet according to the present invention is a sufficiently stiff and tough sheet even when it is thin. The formation of the thin sheet permits a considerable reduction in weight per unit area of the film and the provision of a soil-degradable sheet at low cost.

The sheet according to the present invention can be easily subjected to secondary processing such as vacuum forming or pressure forming making good use of the properties of being high in tensile strength and tensile elongation. If the resulting sheet has tensile strength lower than 60 MPa and/or tensile elongation lower than 5%, there is a possibility that it may be easy to be broken upon its secondary processing, or the resulting formed product from the sheet may become limp and easy to be broken.

<Thickness>

The thickness of the sheet according to the present invention is generally 0.01–5 mm, preferably 0.05–4 mm, more preferably 0.1–3 mm. Any sheet having a thickness smaller than 0.01 mm is not preferable because drawdown or breaking is easy to occur when the polyglycolic acid is melt-extruded through a T-die to form the sheet, and so such a sheet is difficult to produce, and moreover the resulting sheet also involves such problems that it is limp and easy to be broken. On the other hand, any sheet having a thickness exceeding 5 mm tends to cause an uneven crystalline structure due to the time lag in crystallization between the surface portion and the central portion of the sheet in the course of its production. Accordingly, there is a possibility that the toughness of the resulting sheet may be deteriorated.

<Degradability in soil>

The sheet according to the present invention is a soil-degradable sheet which scarcely imposes burden on the environment. More specifically, when the polyglycolic acid sheet according to the present invention is buried at the depth of 10 cm under the ground, it is degraded within generally 24 months, preferably 12 months to lose its original form. The conventional polylactic acid sheet involves a problem that since the glass transition temperature, Tg of polylactic acid is too high, the sheet is difficult to be composted under ordinary conditions. On the other hand, the sheet according to the present invention is formed from the polyglycolic acid the Tg of which is not very high, so that it is possible to compost it under ordinary conditions.

High barrier sheet

It is possible to provide a sheet having a low oxygen permeability by using the specific polyglycolic acid described above. More specifically, the sheet according to the present invention exhibits high barrier properties as demonstrated by its oxygen permeability (as measured at a temperature of 23° C. and 80% relative humidity; in terms of the thickness of 25 μm) of generally 100 cc/m$^2$.day.atm or smaller, preferably 50 cc/m$^2$.day.atm or smaller, more preferably 30 cc/m$^2$.day.atm or smaller.

The sheet according to the present invention is also excellent in carbon dioxide barrier property and has a carbon dioxide permeability (as measured at a temperature of 23° C. and 80% relative humidity in accordance with JIS K 7126; in terms of the thickness of 25 μm) of generally 300 cc/m$^2$.day.atm or smaller, preferably 200 cc/m$^2$.day.atm or smaller, more preferably 50 cc/m$^2$.day.atm or smaller.

Production process of sheet

<Raw polymer>

The polyglycolic acid used as a raw material of the sheet according to the present invention can be prepared by the following process.

(1) The polyglycolic acid can be obtained by heating glycolide (i.e., 1,4-dioxane-2,5-dione) to a temperature of about 120° C.–250° C. in the presence of a small amount of a catalyst (for example, a cationic catalyst such as a tin organic carboxylate, tin halide or antimony halide), thereby subjecting it to ring-opening polymerization. The ring-opening polymerization is preferably conducted by a bulk polymerization process or solution polymerization process. (2) The polyglycolic acid can be obtained by a polycondensation process wherein glycolic acid or an alkyl glycolate is heated in the presence or absence of a catalyst, thereby subjecting it to dehydration or dealcoholization.

In order to obtain a glycolic acid copolymer, it is only necessary to copolymerize glycolide, glycolic acid or an alkyl glycolate in accordance with the above process (1) or (2) in suitable combination with, as a comonomer, for example, a cyclic monomer such as ethylene oxalate (i.e., 1,4-dioxane-2,3-dione), lactide, a lactone (for example, β-propiolactone, β-butyrolactone, pivalolactone, γ-butyrolactone, δ-valerolactone, β-methyl-δ-valerolactone or ε-caprolactone), trimethylene carbonate or 1,3-dioxane; a hydroxycarboxylic acid such as lactic acid, 3-hydroxypropanoic acid, 3-hydroxybutanoic acid, 4-hydroxybutanoic acid or 6-hydroxycaproic acid or an alkyl ester thereof; a substantially equimolar mixture of an aliphatic diol such as ethylene glycol or 1,4-butanediol and an aliphatic dicarboxylic acid such as succinic acid or adipic acid or an alkyl ester thereof; or two or more compounds thereof. The glycolic acid copolymer may be that obtained by subjecting the polyglycolic acid and another polymer having repeating units selected from among the formulae (2) to (4) to transesterification under heat. Of the above preparation processes, the process (1) in which glycolide is subjected to ring-opening polymerization is preferred because a high-molecular weight polyglycolic acid is easy to be obtained.

As the glycolide used as a monomer in the process (1), glycolide obtained by "a solution-phase depolymerization process" (Japanese Patent Application No. 48000/1996) developed by the present inventors is preferred to that obtained by the conventional sublimation depolymerization process of a glycolic acid oligomer because a high-purity product can be mass-produced at a higher yield. The use of high-purity glycolide as a monomer permits the easy provision of high-molecular weight polyglycolic acid.

The solution-phase depolymerization process is performed by (1) heating a mixture containing a glycolic acid oligomer and at least one high-boiling polar organic solvent having a boiling point within a range of 230–450° C. to a temperature, at which the depolymerization of the oligomer takes place, under ordinary pressure or under reduced pressure; (2) dissolving the oligomer in the solvent until a residual rate (volume ratio) of a melt phase of the oligomer reaches 0.5 or lower; (3) further continuing the heating at the same temperature to depolymerize the oligomer; (4) distilling out a dimeric cyclic ester (i.e., glycolide) formed together with the high-boiling polar organic solvent; and (5) recovering glycolide from the distillate.

Examples of the high-boiling polar organic solvent include aromatic carboxylic acid esters, such as bis (alkoxyalkyl) phthalates such as di(2-methoxyethyl) phthalate, alkylene glycol dibenzoates such as diethylene glycol dibenzoate, benzylbutyl phthalate, and dibutyl phthalate; and aromatic phosphoric acid esters such as tricresyl phosphate. The high-boiling polar organic solvent is used in a proportion of generally 0.3–50 times (weight ratio) to the oligomer. Polypropylene glycol, polyethylene glycol, tetraethylene glycol or the like may be used as a solubilizing agent for the oligomer in combination with the high-boiling polar organic solvent as needed. The depolymerization of the glycolic acid oligomer is generally conducted at 230° C. or higher, preferably 230–320° C. Although the depolymerization is performed under atmospheric pressure or reduced pressure, it is preferable to heat the oligomer under reduced pressure of 0.1–90.0 kPa (1–900 mbar) to depolymerize it.

<Thermoplastic resin material>

In the present invention, the thermoplastic resin material comprising the specific polyglycolic acid described above is used as a raw material for the polyglycolic acid sheet. A neat resin of the polyglycolic acid can be used as the thermoplastic resin material by itself. A composition obtained by incorporating inorganic fillers, other thermoplastic resins, plasticizers and the like into the polyglycolic acid within limits not impeding the object of the present invention may also be used as the thermoplastic resin material. More specifically, there may be used a composition (compound) obtained by incorporating the inorganic fillers, other thermoplastic resins and plasticizers in proportions of 0–100 parts by weight, 0–100 parts by weight and 0–200 parts by weight, respectively, per 100 parts by weight of the polyglycolic acid. If the inorganic fillers or other thermoplastic resins are used in a proportion exceeding 100 parts by weight, or the plasticizers are used in a proportion exceeding 200 parts by weight, there is a possible problem that the tensile strength and resistance to heat shrinkage of the resulting sheet may become insufficient, or the melt processability of the composition may be deteriorated.

Examples of the inorganic fillers include powders, whiskers and fibers of inorganic materials such as alumina, silica, silica-alumina, zirconia, titanium oxide, iron oxide, boron oxide, calcium carbonate, calcium silicate, calcium phosphate, calcium sulfate, magnesium carbonate, magnesium silicate, magnesium phosphate, magnesium sulfate, kaolin, talc, mica, ferrite, carbon, silicon, silicon nitride, molybdenum disulfide, glass and potassium titanate. These inorganic fillers may be used either singly or in any combination thereof. Although the inorganic fillers are generally used in a proportion of 0–100 parts by weight per 100 parts by weight of the polyglycolic acid, it is desirable to use them in a range of 0.01–10 parts by weight, preferably 0.05–5 parts by weight taking film-forming property and toughness into consideration.

Examples of the other thermoplastic resins include a homopolymer and copolymers of lactic acid, a homopolymer and copolymers of ethylene oxalate, a homopolymer and copolymers of ε-caprolactone, polysuccinates, polyhydroxybutanoic acid, hydroxybutanoic acid-hydroxyvaleric acid copolymers, cellulose acetate, polyvinyl alcohol, starch, polyglutamates, natural rubber, polyethylene, polypropylene, styrene-butadiene copolymer rubber, acrylonitrile-butadiene copolymer rubber, polymethyl methacrylate, polystyrene, styrene-butadiene-styrene block copolymers, styrene-ethylene-butylene-styrene block copolymers, ABS resins, MBS resins and ethylene-vinyl alcohol copolymers. These thermoplastic resins may be used either singly or in any combination thereof. Although these thermoplastic resins are generally used in a proportion of 0–100 parts by weight per 100 parts by weight of the polyglycolic acid, it is desirable to use them in a proportion of at most 50 parts by weight, preferably at most 30 parts by weight taking toughness and degradability in soil into consideration.

Examples of the plasticizers include phthalates such as di(methoxyethyl) phthalate, dioctyl phthalate, diethyl phthalate and benzylbutyl phthalate; benzoates such as diethylene glycol dibenzoate and ethylene glycol dibenzoate; aliphatic dibasic acid esters such as octyl adipate and octyl sebacate; aliphatic tribasic acid esters such as tributyl acetylcitrate; phosphates such as dioctyl phosphate and tricresyl phosphate; epoxy plasticizers such as epoxidized soybean oil; and polyalkylene glycol esters such as polyethylene glycol sebacate and polypropylene glycol laurate. These plasticizers may be used either singly or in any combination thereof. Although the plasticizers are generally used in a proportion of 0–200 parts by weight per 100 parts by weight of the polyglycolic acid, it is desirable to use them in a proportion of at most 100 parts by weight, preferably at most 50 parts by weight taking film-forming property, toughness and resistance to heat shrinkage into consideration.

In the present invention, various additives such as heat stabilizers, light stabilizers, moistureproofing agents, waterproofing agents, water repellents, lubricants, releasing agents, coupling agents, pigments and dyes may be contained in the thermoplastic resin material as needed. These various additives are used in an effective amount as necessary for the end application intended.

The composition is prepared by a method known per se in the art by feeding the polyglycolic acid and at least one of the other components such as the inorganic fillers, thermoplastic resins, plasticizers and various additives into a kneading extruder to melt and knead them at a cylinder temperature of from Tm to 255° C. (generally, 150–255° C.), extruding them into a strand, and cooling and chopping the strand into pellets.

<Sheet>

The sheet according to the present invention can be produced by melt-extruding the neat resin of the polyglycolic acid or the composition comprising the polyglycolic acid, and optionally heat-setting the extruded sheet. As the melting and sheet-forming process, a T-die process is preferred. A preferable production process of the sheet is as follows:

The thermoplastic resin material is charged into an extruder equipped with a T-die and extruded into a sheet at a temperature of from Tm to 255° C. (generally 150–255° C). The sheet-like extrudate is quenched to the crystallization temperature, $Tc_1$ of the polymer or lower, preferably the glass transition temperature, Tg of the polymer or lower by means of a cooling roll or a cooling medium to obtain a sheet. The sheet is optionally heat set for 1 second to 3 hours in a temperature range of from the crystallization temperature, $Tc_1$ to (Tm+10° C.) (generally 70–240° C.) under tension or under no tension, whereby a heat set sheet can be obtained. When stretching rolls are arranged in place of the cooling roll or prior to the cooling roll to stretch the sheet in a machine direction (M direction), a uniaxially oriented sheet can be produced. If the melt-extrusion temperature exceeds 255° C., there is a possibility that the thermal decomposition of the polymer may be easy to take place, and rapid decrease in molecular weight and bubbling attendant upon the decomposition may occur, resulting in a sheet having too poor properties to subject it to secondary processing.

<Secondary processing>

The polyglycolic acid sheet according to the present invention can be subjected to sheet forming at a temperature of from Tg to (Tm+10° C.) (generally 30–240° C.) by means of, for example, a vacuum forming machine, pressure forming machine or match mold forming machine to impart stereoscopic shapes such as irregularities and deep drawing to the sheet. The sheet can be further punched out as needed, thereby producing various kinds of sheet-forming products.

Application fields

The polyglycolic acid sheet according to the present invention can be used in a wide variety of fields making good use of its features of high toughness, heat resistance and transparency. The sheet of the present invention can be subjected to secondary processing into various formed products. Application fields of the sheet according to the present invention making good use of its high heat resistance include, for example, containers (such as trays and cups) for electronic ranges, retort food packaging materials, medical instrument packaging materials capable of subjecting to high-temperature sterilization, containers (such as cups) for boiling water pouring type instant food and various kinds of disposable ware (for example, soup plates). Application fields of the sheet according to the present invention making good use of its high toughness include, for example, egg cartons, cushioning materials, stationery and doll cases.

ADVANTAGES OF THE INVENTION

According to the present invention, there can be cheaply provided sheets having excellent toughness and barrier properties and exhibiting good degradability in soil. Since the sheets according to the present invention have the features of high toughness, barrier properties and transparency, they can be suitably used in application fields making good use of their features by subjecting them to secondary processing, for example, containers for electronic ranges, retort food packaging materials, medical instrument packaging materials, instant food containers, various kinds of disposable ware, egg cartons, cushioning materials, stationery and doll cases.

EMBODIMENTS OF THE INVENTION

The present invention will hereinafter be described more specifically by the following Synthesis Examples, Examples and Comparative Examples.

Measuring methods of physical properties (1) Melt viscosity, $\eta^*$:

As indices to the molecular weights of polymers, their melt viscosities, $\eta^*$ were measured. A crystallized sheet obtained by heating an amorphous sheet about 0.2 mm thick of each polymer at about 150° C. for 5 minutes was used as a sample, and the melt viscosity of the sample was measured at a temperature of (Tm+20° C.) and a shear rate of 100/sec by means of a "Capirograph" (trade name, manufactured by Toyo Seiki Seisakusho, Ltd.) equipped with a nozzle having a diameter (D) of 0.5 mm and a length (L) of 5 mm.

(2) Thermal properties of polymer

An amorphous sheet about 0.2 mm thick of each polymer was used as a sample and heated by means of a differential scanning calorimeter (DSC; TC-10A Model, manufactured by METTLER. INSTRUMENT AG) at a rate of 10° C./min under a nitrogen gas stream, thereby measuring the crystallization temperature ($Tc_1$), melting point (Tm) and melt enthalpy ($\Delta$Hm) of the sample. Incidentally, the glass transition temperature (Tg) was measured at a heating rate of 5° C./min.

(3) Density of unoriented, crystallized sheet

A sheet obtained by heat-setting an amorphous sheet about 0.2 mm thick of each polymer at about 150° C. for 5 minutes was used as a sample, and the density of the sample was measured in accordance with JIS R 7222 (a pycnometer method making use of n-butanol).

(4) Thickness of sheet

The thicknesses of 10 points of each sheet sample were measured by means of a micrometer ($\mu$-mate, trade name, manufactured by SONY CORP.) to determine an average value thereof.

(5) Density of sheet

Aqueous zinc chloride.hydrochloric acid solutions different in specific gravity were prepared in accordance with a sink-float method by aqueous zinc chloride solutions, and pieces of each sheet sample were immersed therein at 20° C. to observe their sink or float states, thereby determining the density of the sheet sample.

(6) Tensile strength and elongation

Using a TENSILON (trade name, manufactured by Toyo Baldwin K.K.), a strip-like specimen 10 mm wide was held by clamps so as to give a sample length of 30 mm to measure the tensile strength and elongation of the sample at 23° C. and a cross-head speed of 100 mm/min.

(7) Barrier properties

The oxygen permeability and carbon dioxide permeability of each sheet sample were measured at 23° C. and 80% RH in accordance with JIS K 7126 by means of a double-side moistening gas permeability tester manufactured by GL Sciences Inc., and the measured values were converted into values in a sheet thickness of 25 $\mu$m.

(8) Degradability in soil

Each sheet sample was cut into strips about 3 cm wide and buried at the depth of 10 cm under the ground of a plowland. The strips were dug up at intervals of a half month to observe their shapes. The time the shape of the strip began to deform was observed, whereby the sheet sample was ranked as being soil-degradable where the shape of the strip began to degrade within 24 months after buried under ground.

Synthesis Example 1 Synthesis of monomer

A 10-liter autoclave was charged with 5.5 kg of glycolic acid (product of Wako Pure Chemical Industries, Ltd.). While stirring, the temperature of the contents was raised from 170° C. to 200° C. over about 2 hours to heat them, whereby glycolic acid was condensed while distilling off water formed. The pressures inside the autoclave was then reduced to 20 kPa (200 mbar), and the reaction mixture was held for 2 hours under such a pressure, thereby distilling off low-boiling matter to prepare a glycolic acid oligomer. The melting point, Tm of the thus-obtained oligomer was 205° C.

A 10-liter flask was charged with 1.3 kg of the glycolic acid oligomer, and 5.5 kg of benzylbutyl phthalate (product of Junsei Chemical Co., Ltd.) as a solvent and 165 g of polypropylene glycol (#400, product of Junsei Chemical Co., Ltd.) as a solubilizing agent were added. The mixture was heated to 270° C. under reduced pressure of 5 kPa (50 mbar) in a nitrogen gas atmosphere to conduct "solution-phase depolymerization" of the oligomer. Glycolide formed was distilled out together with benzylbutyl phthalate.

Cyclohexane about twice as much as the distillate by volume was added to the distillate collected, whereby glycolide was crystallized from benzylbutyl phthalate and collected by filtration. The glycolide thus obtained was recrystallized from ethyl acetate and dried under reduced pressure, thereby obtaining glycolide at a yield of about 75%.

Polymer Preparation Example 1

A PFA-made cylinder was charged with 220 g of glycolide obtained in Synthesis Example 1, and the glycolide was dried at room temperature for about 30 minutes while introducing nitrogen gas. Then, 0.044 g of $SnCl_4.6.5H_2O$ as a catalyst was added, and the contents were held at 170° C. for 2 hours while introducing nitrogen gas therein, thereby polymerizing glycolide. After completion of the polymerization, the cylinder was cooled down to room temperature, and a bulk polymer taken out of the cylinder was ground into fine particles having a particle size of about 3 mm or smaller. The fine particles were dried overnight at about 150° C. under reduced pressure of about 0.1 kPa to remove a remaining monomer, thereby obtaining polyglycolic acid [Polymer (P-1)]. The same process was conducted repeatedly to produce a necessary amount of Polymer (P-1).

Polymer Preparation Example 2

Polymerization and post-treatment were performed in the same manner as in Polymer Preparation Example 1 except that a mixture of 210 g of glycolide and 10 g of ethylene oxalate (1,4-dioxane-2,3-dione) was used in place of 220 g of glycolide, thereby obtaining a glycolic acid-ethylene oxalate copolymer [Polymer (P-2)]. The same process was conducted repeatedly to prepare a necessary amount of Polymer (P-2).

Polymer Preparation Example 3

Polymerization and post-treatment were performed in the same manner as in Polymer Preparation Example 1 except that a mixture of 210 g of glycolide and 10 g of L-(−)-lactide was used in place of 220 g of glycolide, thereby obtaining a glycolic acid-lactide copolymer [Polymer (P-3)]. The same process was conducted repeatedly to prepare a necessary amount of Polymer (P-3).

Polymer Preparation Example 4

L-(−)-Lactide (product of Tokyo Kasei Kogyo Co., Ltd.) was recrystallized from ethanol to purify it. A PFA-made cylinder was charged with 220 g of the purified L-(−)-lactide, and the lactide was dried at room temperature for about 30 minutes while introducing nitrogen gas. Then, 0.055 g of tin octanoate as a catalyst was added, and the contents were held at 130° C. for 10 hours while introducing nitrogen gas therein, thereby polymerizing the lactide. After completion of the polymerization, the cylinder was cooled down to room temperature, and a bulk polymer taken out of the cylinder was ground into fine particles having a particle size of about 3 mm or smaller. The fine particles were dried overnight at about 100° C. under reduced pressure of about 0.1 kPa to remove a remaining monomer, thereby obtaining polylactide [Polymer (CP-1)]. The same process was conducted repeatedly to produce a necessary amount of Polymer (CP-1).

Polymer Preparation Example 5

Added to glycolic acid were 0.1 wt. % of triphenyl phosphate and 0.01 wt. % of antimony trioxide. The mixture was heated at 200° C. for about 1.5 hours while introducing nitrogen gas to dehydrate it. The pressure of the reaction system was then reduced to 0.1–0.6 kPa over about 0.7 hour. A stirring blade was then inserted, and the mixture was heated up to 220° C. over about 0.7 hour with stirring under reduced pressure of 0.1–0.6 kPa. The stirring was continued for 11 hours while raising the degree of vacuum as high as possible, during which the mixture was heated to 245° C. if a polymer formed was solidified, thereby melting the polymer.

The resulting crude polymer was ground and sifted through a 20-mesh screen, charged into a flask and heated to remelt. While stirring under reduced pressure, the melt was further heated at 218° C. for 24 hours to turn remaining glycolide out of the melt, thereby obtaining a direct polycondensation type polyglycolic acid [Polymer (CP-2)] at a yield of about 60%.

The physical properties of the polymers obtained in Polymer Preparation Example 1–5 are shown in Table 1.

TABLE 1

| | Polymer Preparation Example | | | | |
|---|---|---|---|---|---|
| | 1 | 2 | 3 | 4 | 5 |
| Composition of [*1] Monomer (wt/wt) | GA | GA/EX = 95/5 | GA/LA = 95/5 | LA | GA |
| Polymer code | P-1 | P-2 | P-3 | CP-1 | CP-2 |
| η* (Pa · s) | 4,500 | 4,000 | 4,300 | 3,400 | 200 |
| Thermal properties | | | | | |
| Tg (° C.) | 38 | 38 | 37 | 53 | 37 |
| Tc$_1$ (° C.) | 84 | 76 | 74 | 108 | 90 |
| Tm (° C.) | 221 | 214 | 214 | 175 | 220 |
| ΔHm (J/g) | 73 | 65 | 66 | 50 | 59 |
| Density of crystallized product (g/cm$^3$) | 1.58 | 1.57 | 1.56 | 1.26 | 1.57 |
| Remarks | ROP[*2] | ROP[*2] | ROP[*2] | ROP[*2] | CP[*3] |

[*1]: GA = Glycolide; EX = Ethylene oxalate, LA = Lactide.
[*2]: ROP = Ring opening polymerization.
[*3]: CP = Condensation polymerization.

EXAMPLE 1

Polymer (P-1) was charged into a small twin-screw extruder equipped with a nozzle having a diameter of 3 mm under a nitrogen gas stream, and extruded into a strand at a melt temperature of about 230° C.–235° C. The strand was quenched and chopped to obtain Pellet (No. 1).

This Pellet (No. 1) was charged into a small extruder equipped with a coathanger type T-die under a nitrogen gas stream to extrude it at a resin melt temperature of about 230° C. into a sheet. The sheet-like extrudate was cut into a desired length to obtain Sheet (S1-1).

EXAMPLE 2

Pellet (No. 2) was prepared in the same manner as in Example 1 except that a mixture of 100 parts by weight of Polymer (P-2) and 0.1 part by weight of alumina powder was used, and the melt temperature was changed to about 225–230° C. Sheet (S2-1) was obtained in the same manner as in Example 1 except that Pellet (No. 2) was used, and the resin melt temperature was changed to about 225° C.

EXAMPLE 3

Pellet (No. 3) was prepared in the same manner as in Example 1 except that a mixture of 100 parts by weight of Polymer (P-3) and 0.1 part by weight of talc was used, and the melt temperature was changed to about 225–230° C. Sheet (S3-1) was obtained in the same manner as in Example 1 except that Pellet (No. 3) was used, and the resin melt temperature was changed to about 225° C.

COMPARATIVE EXAMPLE 1

Pellet (No. C1) was prepared in the same manner as in Example 1 except that Polymer (CP-1) obtained in Polymer Preparation Example 4 was used, and the melt temperature was changed to about 185–190° C. Sheet (SC1-1) was obtained in the same manner as in Example 1 except that Pellet (No. C1) was used, and the resin melt temperature was changed to about 185° C.

COMPARATIVE EXAMPLE 2

Pellet (No. C2) was prepared in the same manner as in Example 1 except that polycondensation type Polymer (CP-2) obtained in Polymer Preparation Example 5 was used. Pellet (No. C2) was used to attempt extrusion at 245–250° C. into a sheet. Although the polymer tended to cause drawdown during take-up and quenching of a molten sheet due to its too low melt viscosity, η*, Sheet (SC2-1) was barely obtained.

COMPARATIVE EXAMPLE 3

Formation of a sheet with Pellet (No. 1) was attempted in the same manner as in Example 1 except that extrusion into a sheet was performed at a resin melt temperature as high as 260° C. However, the resin underwent rapid decomposition during the melt extrusion, resulting in a failure to obtain a normal sheet. Therefore, the extrusion was stopped.

The measurement results of physical properties of the sheets obtained in these Examples and Comparative Examples are shown collectively in Table 2.

TABLE 2

| | Example | | | Comp. Example | | |
|---|---|---|---|---|---|---|
| | 1 | 2 | 3 | 1 | 2 | 3 |
| Polymer code | P-1 | P-2 | P-3 | CP-1 | CP-2 | P-1 |
| Composition | | | | | | |
| Kind of additive | — | Al$_2$O$_3$ | Talc | — | — | — |
| Amount added (parts by weight) | — | 0.1 | 0.1 | — | — | — |
| Pellet code | 1 | 2 | 3 | C1 | C2 | 1 |
| Physical properties of sheet | | | | | | |
| Sheet code | S1-1 | S2-1 | S3-1 | SC1-1 | SC2-1 | — |
| Thickness (mm) | 0.25 | 0.26 | 0.25 | 0.25 | 0.30 | — |
| Density (g/cm$^3$) | 1.58 | 1.57 | 1.56 | 1.26 | 1.57 | — |
| Tensile strength (MPa) | 140 | 130 | 130 | 60 | 35 | — |
| Elongation (%) | 15 | 16 | 13 | 2 | 8 | — |

TABLE 2-continued

|  | Example | | | Comp. Example | | |
|---|---|---|---|---|---|---|
|  | 1 | 2 | 3 | 1 | 2 | 3 |
| $O_2$ permeability (at 80% RH, 23° C.; cc/m$^2$ · day · atm) | 3 | 4 | 4 | 1500 | 4 | — |
| $CO_2$ permeability (at 80% RH, 23° C.; cc/m$^2$ · day · atm) | 15 | 20 | 18 | 8000 | 20 | — |
| Degradability in soil | High | High | High | High | High | — |
| Remarks |  |  |  | *1 |  | *2 |

*1: Polylactic acid.
*2: Forming was stopped.

We claim:

1. A polyglycolic acid sheet obtained by melt-extruding a thermoplastic resin material into a sheet in a temperature range of from the melting point, Tm, of the polymer to 255° C., wherein the thermoplastic resin material comprises polyglycolic acid having a repeating unit represented by the following formula (1):

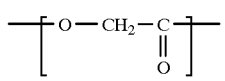 (1)

and the following physical properties:
(a) the melt viscosity, η*, as measured at a temperature of the melting point, Tm, of the polymer+20° C. and a shear rate of 100/sec, being 500–100,000 Pa.s;
(b) the melting point, Tm, being at least 150° C.;
(c) the melt enthalpy, ΔHm, being at least 20 J/g; and
(d) the density being at least 1.50 g/cm$^3$ as measured in an unoriented, crystallized form, and wherein the sheet has tensile strength of at least 60 MPa.

2. The sheet according to claim 1, wherein the sheet is a polyglycolic acid sheet obtained by melt-extruding the thermoplastic resin material into a sheet in a temperature range of from the melting point, Tm, to 255° C., quenching the sheet to the crystallization temperature, Tc$_1$, of the polymer or lower and optionally heat-setting the quenched sheet for 1 second to 3 hours in a temperature range of from the crystallization temperature, Tc$_1$, to Tm+10° C., under tension or under no tension.

3. The sheet according to claim 1, wherein the sheet is degradable in soil.

4. The sheet according to claim 1, wherein the sheet has an oxygen permeability, as measured at a temperature of 23° C. and 80% relative humidity and a film thickness of 25 μm, of 100 cc/m$^2$.day.atm or smaller.

5. The sheet according to claim 1, wherein the sheet has a carbon dioxide permeability, as measured at a temperature of 23° C. and 80% relative humidity and a film thickness of 25 μm, of 300 cc/m$^2$.day.atm or smaller.

6. The sheet according to claim 1, wherein the sheet has an elongation of at least 5%.

7. The sheet according to claim 1, wherein the thermoplastic resin material is composed of the polyglycolic acid alone.

8. The sheet according to claim 1, wherein the thermoplastic resin material is a composition composed of the polyglycolic acid and at least one component selected from the group consisting of inorganic fillers, other thermoplastic resins and plasticizers.

9. The sheet according to claim 8, wherein the thermoplastic resin material is a composition composed of the polyglycolic acid and at least one component selected from the group consisting of inorganic fillers, other thermoplastic resins and plasticizers and comprising 100 parts by weight of the polyglycolic acid, 0–100 parts by weight of the inorganic fillers, 0–100 parts by weight of the other thermoplastic resins and 0–200 parts by weight of the plasticizers.

10. The sheet according to claim 8, wherein the thermoplastic resin material is a composition comprising 100 parts by weight of the polyglycolic acid and 0.01–10 parts by weight of the inorganic fillers.

11. The sheet according to claim 1, wherein the polyglycolic acid is a homopolymer of glycolide obtained by ring-opening polymerization.

12. The sheet according to claim 1, wherein the polyglycolic acid is a copolymer obtained by ring-opening polymerization of glycolide in a proportion not lower than 70 wt. %, but lower than 100 wt. % and at least one cyclic comonomer selected from the group consisting of ethylene oxalate, lactide, lactones, trimethylene carbonate and 1,3-dioxane in a proportion higher than 0 wt. %, but not higher than 30 wt. %.

13. The sheet according to claim 12, wherein the polyglycolic acid is a copolymer of glycolide in a proportion not lower than 70 wt. %, but lower than 100 wt. % and ethylene oxalate.

14. The sheet according to claim 12, wherein the polyglycolic acid is a copolymer of glycolide in a proportion not lower than 70 wt. %, but lower than 100 wt. % and lactide.

15. A process for producing a polyglycolic acid sheet, comprising the steps of melt-extruding a thermoplastic resin material which comprises polyglycolic acid having a repeating unit represented by the following formula (1):

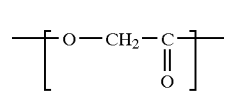 (1)

and the following physical properties:
(a) the melt viscosity, η*, as measured at a temperature of the melting point, Tm, of the polymer+20° C. and a shear rate of 100/sec, being 500–100,000 Pa.s;
(b) the melting point, Tm, being at least 150° C.;
(c) the melt enthalpy, ΔHm, being at least 20 J/g; and
(d) the density being at least 1.50 g/cm$^3$ as measured in an unoriented, crystallized form, the melt extruding being performed through a T-die and in a temperature range of from the melting point, Tm, to 255° C. to form the thermoplastic resin material into a sheet; quenching the sheet to the crystallization temperature, Tc$_1$, of the polymer or lower; and optionally heat-setting the quenched sheet for 1 second to 3 hours in a temperature range of from the crystallization temperature, Tc$_1$, to Tm+10° C. under tension or under no tension.

16. The production process according to claim 15, wherein the thermoplastic resin material is composed of the polyglycolic acid alone.

17. The production process according to claim 15, wherein the thermoplastic resin material is a composition composed of the polyglycolic acid and at least one component selected from the group consisting of inorganic fillers, other thermoplastic resins and plasticizers.

18. The production process according to claim 15, wherein the polyglycolic acid is a homopolymer of glycolide obtained by ring-opening polymerization.

19. The production process according to claim 15, wherein the polyglycolic acid is a copolymer obtained by ring-opening polymerization of glycolide in a proportion not lower than 70 wt. %, but lower than 100 wt. % and at least one cyclic comonomer selected from the group consisting of ethylene oxalate, lactide, lactones, trimethylene carbonate and 1,3-dioxane in a proportion higher than 0 wt. %, but not than 30 wt. %.

* * * * *

UNITED STATES PATENT AND TRADEMARK OFFICE
CERTIFICATE OF CORRECTION

PATENT NO. : 5,908,917
DATED : June 1, 1999
INVENTOR(S) : Yukichika Kawakami et al It is certified that error appears in the above-indentified patent and that said Letters Patent is hereby corrected as shown below:

Claim 19, column 18, line 3, before "than 30 wt. percent." insert --higher--.

Signed and Sealed this

Ninth Day of November, 1999

Attest:

Q. TODD DICKINSON

*Attesting Officer*  *Acting Commissioner of Patents and Trademarks*